A. BRIDGES.
Car-Springs.

No. 139,862.  Patented June 17, 1873.

Witnesses
Chas H. Smith
Geo. D. Walker

Inventor
Albert Bridges.
Lemuel W. Serrell
atty

UNITED STATES PATENT OFFICE.

ALBERT BRIDGES, OF WESTFIELD, NEW JERSEY.

IMPROVEMENT IN CAR-SPRINGS.

Specification forming part of Letters Patent No. 139,862, dated June 17, 1873; application filed March 21, 1873.

*To all whom it may concern:*

Be it known that I, ALBERT BRIDGES, of Westfield, in the county of Union and State of New Jersey, have invented an Improvement in Car-Springs, of which the following is a specification:

Springs for cars, &c., have been made of India-rubber with a helix of wire around the cylindrical rubber, and also with a cylindrical expansive case divided longitudinally. In the first-named instance, the surface of the rubber is liable to injury by the motion thereof in contact with the helix or coil; in the other case, the expansion of the rubber is unequal, and the block liable to protrude at the opening, between the edges of the divided cylinder.

My invention relates to the combination, with a rubber spring, of metallic plate-springs supported at their ends and against which the rubber expands, and in so doing, bends the plates; hence the spring of the plates aids in restoring the rubber to its original shape, and the said springs expand and contract as a whole, by the increase or decrease of the pressure, and there is but little inequality in the action and risk of injury to the rubber.

Figure 1:
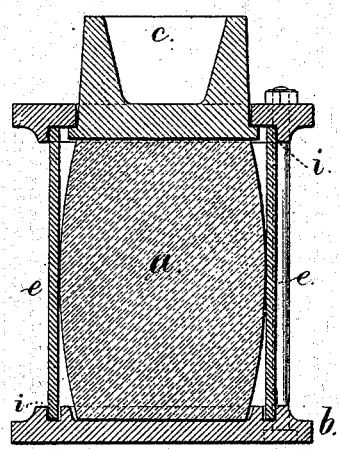
Figure 4:
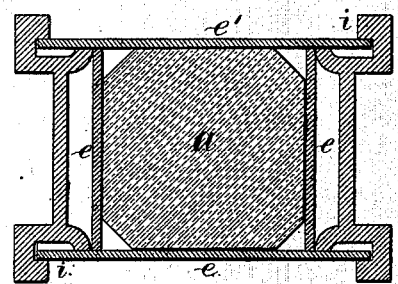
Figure 2:
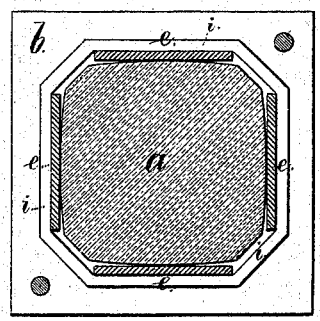
Figure 3:
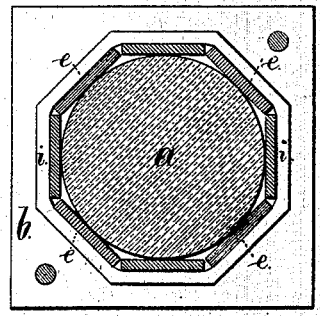
Figure 6:
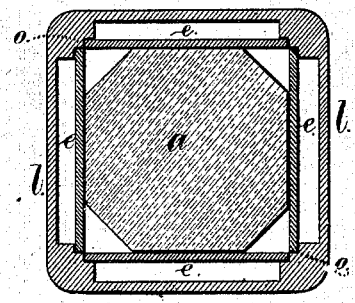
Figure 5:
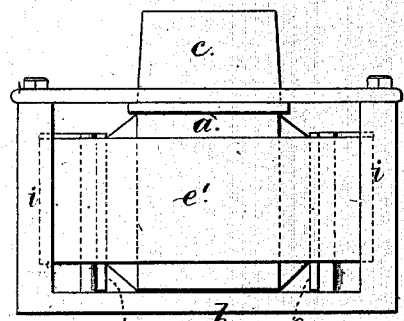

In the drawing, Figure 1 is a vertical section of said improved spring. Fig. 2 is a plan of the same sectionally, and Fig. 3 is a similar view with eight longitudinal springs. Fig. 4 is a section of the said rubber springs with yielding side-plates of unequal lengths. Fig. 5 is an elevation of the same in the form adapted to equalizing-bars and bolsters of trucks, and to car-bumpers; and Fig. 6 is a sectional plan of the spring with the plates sustained at their vertical edges.

The rubber spring or block, either solid or hollow, is shown at $a$, and the same is to be of a size and shape adapted to the purpose to which it is to be applied. The base-plate $b$ sustains the rubber at the end opposite to that against which the follower $c$ operates. The plates $e$ are of metal, preferably of steel, and they are to be of a size and thickness proportioned to the pressure to which they are subjected. Where the rubber spring is to allow considerable movement under a light load these plates will be thin and flexible, and with rigid springs to bear heavy loads, the metal plates will be thicker. The rubber bears, in each instance, against the inner side of the plate near the middle thereof, and the ends of the plates are supported. Where the plates $e$ stand vertical or parallel to the axis of the spring, the ribs or shoulders $i\ i$, that sustain such plates are at the top and bottom ends, as in Figs. 1, 2, 3; but where the plates lie horizontal, as in Fig. 6, the bearings $o\ o$ for the ends of the spring-plates are vertical, and the spring-plates may be in an inclosing-box that is sufficiently large to allow the springs to bend, as the rubber is compressed. This inclosing-box is shown at $l$, Fig. 6. In Fig. 4 the longitudinal side-plates $e'$ are longer than the breadth of the spring $a$, and the transverse springs $e$ correspond to those shown in Fig. 6. This construction is specially adapted to bolsters and the equalizing-bars of car-trucks; also to car-bumpers; but the action of the spring-plates corresponds in all cases.

By removing the corners or angles of the rubber springs the elasticity of the spring will be increased, because the rubber block will expand partially into the angular space before the spring-plates will yield. The movement of the metallic spring-plates is in the same direction as that of the rubber, as expanded by the endwise compression; hence the metal plates support the rubber at the same time that they yield to its pressure.

The resistance of the spring can be greatly varied without any other change than that of removing the plates and inserting others of the same size, but varying in thickness.

I claim as my invention—

A rubber spring, at the sides of which are flat metallic plates that are supported at their ends and bent by the action of the rubber as it presses against such plates, substantially as set forth.

Signed by me this 17th day of March, A. D. 1873.

ALBERT BRIDGES.

Witnesses:
GEO. T. PINCKNEY,
CHAS. H. SMITH.